(12) United States Patent
Okamoto et al.

(10) Patent No.: US 8,320,614 B2
(45) Date of Patent: Nov. 27, 2012

(54) SCENE SWITCHING POINT DETECTOR, SCENE SWITCHING POINT DETECTING METHOD, RECORDING APPARATUS, EVENT GENERATOR, EVENT GENERATING METHOD, REPRODUCING APPARATUS, AND COMPUTER PROGRAM

(75) Inventors: Hiroshige Okamoto, Kanagawa (JP); Masaru Miyamoto, Tokyo (JP)

(73) Assignee: Sony Corporation (JP)

( * ) Notice: Subject to any disclaimer, the term of this patent is extended or adjusted under 35 U.S.C. 154(b) by 981 days.

(21) Appl. No.: 12/321,574

(22) Filed: Jan. 22, 2009

(65) Prior Publication Data
US 2009/0190836 A1    Jul. 30, 2009

(30) Foreign Application Priority Data

Jan. 25, 2008    (JP) .................................. 2008-014419

(51) Int. Cl.
*G06K 9/00* (2006.01)
(52) U.S. Cl. ........................................................ 382/103
(58) Field of Classification Search ................... 382/103
See application file for complete search history.

(56) References Cited

U.S. PATENT DOCUMENTS

| | | | |
|---|---|---|---|
| 5,732,146 A * | 3/1998 | Yamada et al. | .............. 382/107 |
| 6,301,302 B1 | 10/2001 | Kikuchi et al. | |
| 6,373,979 B1 | 4/2002 | Wang | |

FOREIGN PATENT DOCUMENTS

| | | |
|---|---|---|
| JP | 10294923 A | 11/1998 |
| JP | 10327386 A | 12/1998 |
| JP | 2002-027411 A | 1/2002 |
| JP | 2006-129363 A | 5/2006 |
| JP | 2006270301 A | 10/2006 |
| JP | 2007149095 A | 6/2007 |

OTHER PUBLICATIONS

Chong-Wah Ngo et al: Motion-based Video Representation for Scene Change Detection. International Journal of Computer Vision, vol, 50, No. 2, Jan. 1, 2002 pp. 127-142, XP 009146766.
Paul Browne et al: "Evaluating and Combining Digital VideoShot Boundary Detection Algorithms" Irish Machine Vision and Image Processing Conference, Aug. 31, 2000 pp. 1-8, XP 009146728.
Partial European Search Report EP 09150978, dated Apr. 13, 2011.
Office Action from Japanese Application No. 2008-014419, dated Oct. 11, 2011.

* cited by examiner

*Primary Examiner* — Alex Liew
(74) *Attorney, Agent, or Firm* — Lerner, David, Littenberg, Krumholz & Mentlik, LLP

(57) ABSTRACT

A scene switching point detector includes: a feature-information generating unit that generates feature information indicating a feature of each of target frames; a backward-similarity calculating unit that sets each of the target frames as a similarity calculation frame in order and calculates backward similarity on the basis of the feature information of the similarity calculation frame and the feature information of the target frames temporally located before the similarity calculation frame; a forward-similarity calculating unit that sets each of the target frames as a similarity calculation frame in order and calculates forward similarity on the basis of the feature information of the similarity calculation frame and the feature information of the target frames temporally located after the similarity calculation frame; and a scene switching point detector that detects the target frame forming a scene switching point on the basis of the backward similarity and the forward similarity.

7 Claims, 9 Drawing Sheets

| No. | i-m-2 | i-m-1 | i-m | ... | i-2 | i-1 | i | i+1 | i+2 | ... | i+m | i+m+1 | i+m+2 |
|---|---|---|---|---|---|---|---|---|---|---|---|---|---|
| FEATURE VECTOR | $X_{i-m-2}$ | $X_{i-m-1}$ | $X_{i-m}$ | | $X_{i-2}$ | $X_{i-1}$ | $X_i$ | $X_{i+1}$ | $X_{i+2}$ | | $X_{i+m}$ | $X_{i+m+1}$ | $X_{i+m+2}$ |

$Sim(i, i-m)$, $Sim(i, i-2)$, $Sim(i, i-1)$, $Sim(i, i+1)$, $Sim(i, i+2)$, $Sim(i, i+m)$

CONVERSION FUNCTION

SCENE SWITCHING POINT DETECTOR, SCENE SWITCHING POINT DETECTING METHOD, RECORDING APPARATUS, EVENT GENERATOR, EVENT GENERATING METHOD, REPRODUCING APPARATUS, AND COMPUTER PROGRAM

CROSS-REFERENCES TO RELATED APPLICATIONS

The present application claims priority from Japanese Patent Application No. JP 2008-014419, filed in the Japanese Patent Office on Jan. 25, 2008, the entire content of which is incorporated herein by reference.

BACKGROUND OF THE INVENTION

1. Field of the Invention

The present invention relates to a scene switching point detector, a scene switching point detecting method, a recording apparatus, an event generator, an event generating method, a reproducing apparatus, and a computer program that are suitably applied to a DVD recorder, an HD recorder, and the like that record and reproduce video signals.

More particularly, the present invention relates to a scene switching point detector and the like that can detect scene switching points at appropriate intervals by setting each of target frames at every fixed time of an input video signal as a similarity calculating frame in order, calculating backward similarity on the basis of the similarity calculation frame and feature information of a predetermined number of target frames located before the similarity calculation frame, calculating forward similarity on the basis of the similarity calculation frame and feature information of a predetermined number of the target frames located after the similarity calculation frame, and detecting the target frame forming a scene switching point on the basis of the backward similarity and the forward similarity of each of the target frames.

The present invention also relates to an event generator and the like that can satisfactorily generate an event by setting each of scene switching points, which are obtained from information concerning scene switching points in plural systems, as an event candidate point and selecting, on the basis of a score of each of event candidate points calculated on the basis of the information concerning the scene switching points in the plural systems, a predetermined point to be set as an event.

2. Description of the Related Art

In the past, when a video signal related to a television broadcast, a video signal imaged by a video camera, or the like is recorded by a DVD recorder, an HD recorder, or the like, it is conceivable to detect scene switching points, record information concerning the scene switching points in association with the video signal, and use the information as information concerning a reproduction skip position for checking contents or searching for an editing point (see, for example, JP-A-2002-27411).

In the past, as a method of detecting scene switching points, there have been proposed various methods such as a method of analyzing a video signal to detect scene switching points and a method of analyzing a sound signal recorded in association with a video signal to detect scene switching points.

SUMMARY OF THE INVENTION

When information concerning scene change points is used as information concerning scene switching points, problems explained below occur. In the case of a video signal related to a television broadcast, a frequency of scene change is high. When a user performs operation for skipping a reproduction position in order to check contents or search for an editing point, the skipping operation is performed a large number of times and operation is complicated.

In the case of a video signal (personal content) imaged by a video camera, the length of one scene substantially fluctuates and, in some case, the length is equal to or longer than ten minutes. Therefore, when the user performs operation for skipping a reproduction position in order to check contents or search for an editing point, since a skip interval substantially fluctuates, the user is confused.

Therefore, it is desirable to detect scene switching points at appropriate intervals. It is also desirable to satisfactorily generate, for example, an event that can be used as reproduction skip position information from information concerning scene switching points in plural systems.

According to an embodiment of the present invention, there is provided a scene switching point detector including:

a feature-information generating unit that sets frames at every fixed time as target frames and generates feature information indicating a feature of each of the target frames;

a backward-similarity calculating unit that sets each of the target frames as a similarity calculation frame in order and calculates backward similarity on the basis of the feature information of the similarity calculation frame generated by the feature-information generating unit and the feature information of a predetermined number of the target frames temporally located before the similarity calculation frame;

a forward-similarity calculating unit that sets each of the target frames as a similarity calculation frame in order and calculates forward similarity on the basis of the feature information of the similarity calculation frame generated by the feature-information generating unit and the feature information of a predetermined number of the target frames temporally located after the similarity calculation frame; and a scene switching point detector that detects the target frame forming a scene switching point on the basis of the backward similarity of each of the target frames calculated by the backward-similarity calculating unit and the forward similarity of each of the target frames calculated by the forward-similarity calculating unit.

In this embodiment, frames at every fixed time of an input video signal are set as target frames for detecting scene switching points. The feature-information generating unit generates feature information indicating a feature of an image of each of the target frames.

Each of the target frames are set as a similarity calculation frame. The backward-similarity calculating unit calculates backward similarity on the basis of the feature information of the similarity calculation frame and the feature information of the predetermined number of the target frames temporally located before the similarity calculation frame. For example, the backward-similarity calculating unit calculates backward similarity by calculating similarities between the similarity calculation frame and the predetermined number of the target frames located before the similarity calculation frame and calculating a sum of the similarities.

The similarities between the similarity calculation frame and the predetermined number of the target frames located before the similarity calculation frame are obtained, when the feature information is the feature vector, by calculating a distance between feature vectors.

The forward-similarity calculating unit calculates forward similarity on the basis of the feature information of the similarity degree calculation frame and the feature information of the predetermined number of the target frames temporally located after the similarity calculation frame. For example, the forward-similarity calculating unit calculates forward similarity by calculating, in the same manner as calculating the backward similarity, similarities between the similarity calculation frame and the predetermined number of the target frames located after the similarity calculation frame and calculating a sum of the similarities.

The scene switching point detecting unit detects the target frame forming a scene switching point on the basis of the backward similarity of each of the target frames and the forward similarity of each of the target frames calculated as explained above. For example, the target frame, the backward similarity of which suddenly falls and the forward similarity of which suddenly rises, is set as the target frame forming the scene switching point.

As explained above, the scene switching point (the target frame forming the scene switching point) is detected on the basis of the backward similarity of the target frames and the forward similarity of the target frames. Therefore, since scenes similar to each other to some extent are combined, it is possible to detect scene switching points at appropriate intervals.

It is preferable that, for example, the scene switching point detector further includes a scene-change-point detecting unit that sets each of the target frames as a scene change detection frame in order, compares the feature information of the scene change detection frame generated by the feature-information generating unit and the feature information of the target frame temporally located before or after the scene change detection frame, and detects the target frame forming a scene change point, and the scene-switching-point detecting unit sets, when the target frame forming the scene change point detected on the basis of the backward similarity of the target frames calculated by the backward-similarity calculating unit and the forward similarity of the target frames calculated by the forward-similarity calculating unit coincides with the target frame forming the scene change point detected by the scene-change-point detecting unit, the latter target frame as the target frame forming the scene switching point. Since information concerning the scene change point (the target frame forming the scene change point) is further used in this way, it is possible to prevent inconvenience that a point (a frame) in one scene is selected as the scene switching point.

The information concerning the scene switching points detected by the scene switching point detector is recorded in a recording medium together with and in association with a video signal. In this case, only the information concerning the scene switching points detected by the scene switching point detector may be recorded. Alternatively, the information concerning the scene switching points may be recorded together with information concerning scene switching points in another system. The information concerning the scene switching points recorded in the recording medium in this way is used for, for example, generating an event used as skip position information during reproduction.

According to another embodiment of the present invention, there is provided an event generator including:

a score calculating unit that receives input of information concerning scene switching points in plural systems, sets each of the scene switching points as an event candidate point, and calculates a score at each of the event candidate points on the basis of information concerning the scene switching points in the plural systems at each of the event candidate points; and an event selecting unit that selects a predetermined point as an event on the basis of the score of each of the event candidate points calculated by the score calculating unit.

In the embodiment, information concerning scene switching points in plural systems is inputted. The information concerning the scene switching points in the plural systems is reproduced from, for example, a recording medium in which the information concerning the scene switching points is recorded together with and in association with a video signal. The score calculating unit calculates a score at each of event candidate points on the basis of the information concerning the scene switching points in the plural systems at each of the event points.

In this case, for example, the score is calculated by adding up, for each of the event candidate points, first values obtained from the information concerning the scene switching points in the plural systems. For example, when information concerning scene switching points is time-of-day (time code) information indicating the scene switching point (a frame forming the scene switching point), the first values obtained from information concerning scene switching points in a certain system at a predetermined event candidate point are set to 1 when the predetermined event candidate point is a scene switching point indicated by the information concerning the scene switching points in the certain system. Otherwise, the first values are set to 0.

For example, when information concerning scene switching points is a value indicating likelihood of a scene switching point at each time of day (time code) at every fixed time, the first values obtained from the information concerning the scene switching points in a certain system at a predetermined event candidate point are set to a value indicating likelihood of a scene switching point at the predetermined event candidate point.

The event selecting unit selects a predetermined point as an event on the basis of the score at each of the event candidate points calculated as explained above. For example, an event candidate point that satisfies a condition that a score is equal to or higher than a threshold is selected as an event. Consequently, a more appropriate event candidate point among the event candidate points is selected as en event.

For example, an event candidate point that satisfies a condition that a score is equal to or higher than a threshold and no other event candidate point having a score larger than the score of the event candidate point is present in a range of a shortest event interval before and after the event candidate point is selected. This makes it possible to prevent plural events from being generated at the shortest event intervals.

For example, when no event candidate point that satisfies a condition that a score is equal to or higher than a threshold and no other event candidate point having a score larger than the score of the event candidate point is present in a range of a shortest event interval before and after the event candidate point is present in a fixed range after a shortest event interval and before a longest event interval from another event candidate point selected as an event, an event candidate point having a largest score among event candidate points in the fixed range is selected as an event. This makes it possible to prevent an interval of an event to be selected from becoming longer than the longest event interval.

For example, when no event candidate point is present in a fixed range, a predetermined point in the fixed range is selected as an event. For example, as the predetermined point, a temporally later one of a point obtained by adding a shortest event interval to another event candidate point selected as an event and a point obtained by adding a longest event interval to the other event candidate point selected as the event and subtracting the shortest event interval from the other event candidate point is selected as an event. This makes it possible to prevent an interval of an event to be selected from becoming longer than the longest event interval.

It is preferable that the event generator further includes a weighting-coefficient generating unit that generates a weighting coefficient corresponding to the information concerning the scene switching points in the plural systems, and the score calculating unit calculates, for each of event candidate points, second values by multiplying each of the first values obtained from the information concerning the scene switching points in the plural systems with the weighting coefficient generated by the weighting-coefficient generating unit and adds up the second values to calculate a score. In this case, if a weight for information concerning scene switching points in a desired system is set high, it is possible to increase the influence of the information concerning the scene switching points.

As explained above, each of the scene switching points obtained from the information concerning scene switching points in the plural systems is set as an event candidate point and the predetermined point to be set as an event is selected on the basis of a score of each of event candidate points calculated on the basis of the information concerning scene switching points in the plural systems. Therefore, it is possible to satisfactorily generate an event.

The event generator is included in, for example, a reproducing apparatus. The reproducing apparatus includes a reproducing unit that reproduces, from a recording medium in which a video signal and information concerning scene switching points in plural systems concerning the video signal are recorded in association with each other, the video signal and the information concerning scene switching points in the plural systems. An event generated by the event generator is used as control information for control of a reproduction operation, for example, grasp of contents of the video signal or a reproduction skip position in searching for an editing point.

According to the embodiments, each of target frames at every fixed time of an input video signal is set as a similarity calculation frame in order, backward similarity is calculated on the basis of the similarity calculation frame and feature information of a predetermined number of the target frames located before the similarity calculation frame, forward similarity is calculated on the basis of the similarity calculation frame and feature information of a predetermined number of the target frames located after the similarity calculation frame, and the target frame forming a scene switching point is detected on the basis of the backward similarity and the forward similarity of each of the target frames. Therefore, it is possible to detect scene switching points at appropriate intervals.

According to the embodiments, each of scene switching points obtained from information concerning scene switching points in plural systems is set as an event candidate point and a predetermined point to be set as an event is selected on the basis of a score of each of the event candidate points calculated on the basis of the information concerning scene switching points in the plural systems. Therefore, it is possible to satisfactorily generate an event that can be used as, for example, reproduction skip position information.

DESCRIPTION OF THE PREFERRED EMBODIMENTS

Figure 1:
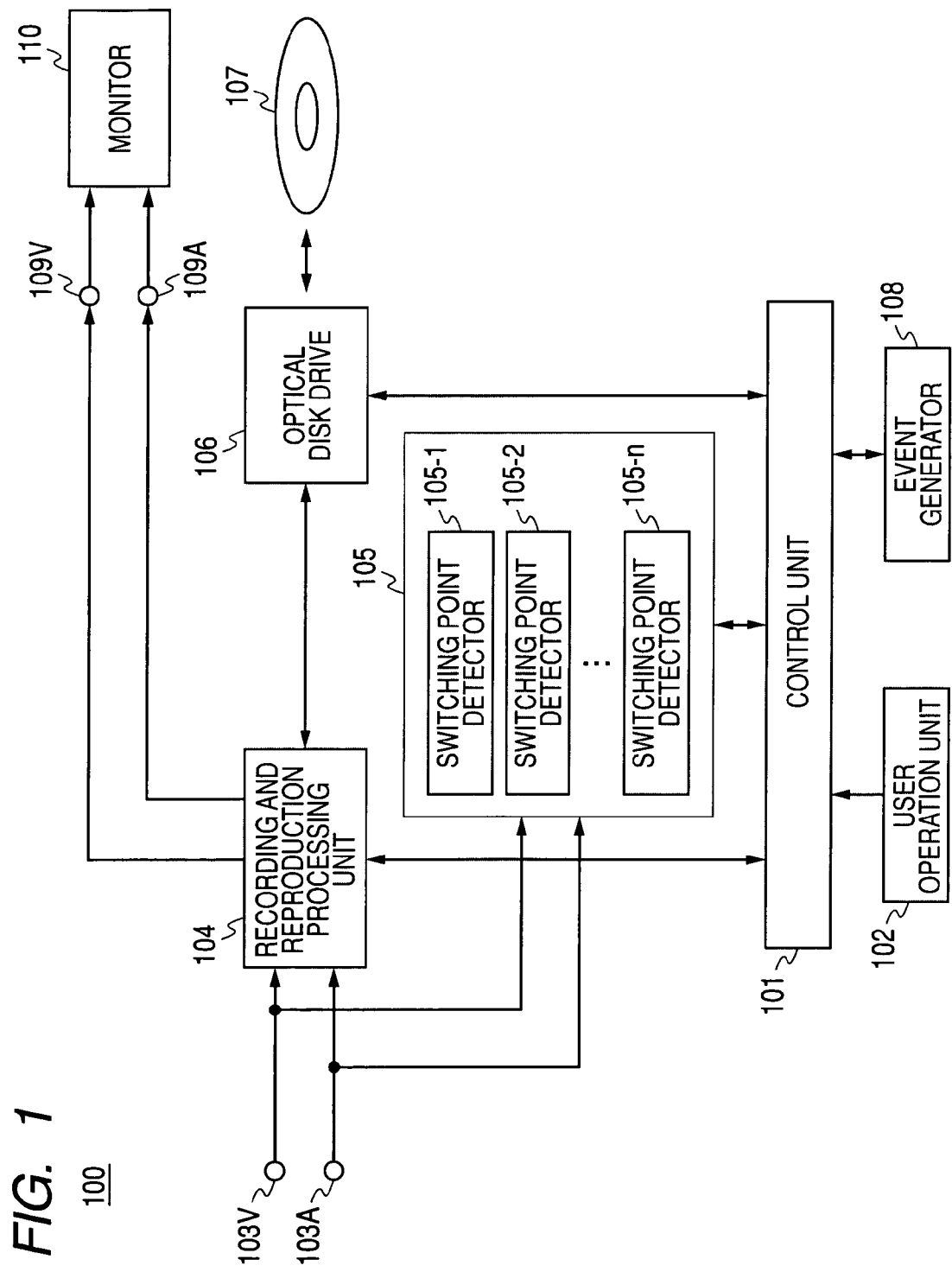
FIG. 1 is a block diagram of a configuration example of a recording and reproducing apparatus according to an embodiment of the present invention.

An embodiment of the present invention is explained below with reference to the accompanying drawings. FIG. 1 is a diagram of a configuration example of a recording and reproducing apparatus 100 according to this embodiment.

The recording and reproducing apparatus 100 includes a control unit 101, a user operation unit 102, a video-signal input terminal 103V, an audio-signal input terminal 103A, a recording and reproduction processing unit 104, a scene-switching-point detecting unit 105, an optical disk driver 106, a DVD 107 as a recording medium, an event generator 108, a video-signal output terminal 109V, and an audio-signal output terminal 109A.

The control unit 101 controls operations of the units of the recording and reproducing apparatus 100. The user operation unit 102 configures a user interface and is connected to the control unit 101. The user operation unit 102 includes keys, buttons, dials, a transmitter receiver of a remote controller, or the like.

The recording and reproduction processing unit 104 applies, during recording, recording processing such as compression encoding corresponding to a recording format to a video signal and an audio signal inputted to the input terminals 103V and 103A to generate video and audio data as recording data and supplies the data to the optical disk drive 106. For example, the recording and reproduction processing unit 104 applies encoding to the video signal in the MPEG (Moving Picture Expert Group) to generate a video elementary stream (ES). Further, the recording and reproduction processing unit 104 applies encoding to the audio signal in the MPEG to generate an audio elementary stream. The recording and reproduction processing unit 104 applies multiplexing to the video and audio elementary streams and various control signals to generate a transport stream (TS) as recording data.

The recording and reproduction processing unit 104 applies, during reproduction, decoding to video and audio data reproduced by the optical disk drive 106 to generate a video signal and an audio signal. For example, the recording and reproduction processing unit 104 separates video and audio elementary streams from reproduction data and applies decoding to the video and audio elementary streams in the MPEG (Moving Picture Expert Group). The recording and reproduction processing unit 104 supplies a reproduced video signal to the video-signal output terminal 109V and supplies a reproduced audio signal to the audio-signal output terminal 109A.

The scene-switching-point detecting unit 105 includes plural scene switching point detectors 105-1 to 105-$n$. The scene switching point detectors 105-1 to 105-$n$ detect scene switching points using, for example, methods different from one another. The scene switching point detectors 105-1 to 105-$n$ process any one or both of the video signal and the audio signal inputted to the input terminals 103V and 103A to detect scene switching points.

For example, the scene switching point detector that processes the audio signal to detect scene switching points detects scene switching points using a signal level or a frequency component. For example, the scene switching point detector that processes the video signal to detect scene switching points detects scene switching points using, for example, a feature vector including plural vector elements obtained by processing a pixel signal of a frame image for each of divided blocks or a histogram of luminance and color difference obtained by processing the pixel signal of the frame image.

For example, the scene switching point detector that processes the video signal to detect scene switching points detects scene switching points using a detection output of detection of a specific object, for example, face detection.

Information concerning scene switching points in plural systems outputted from the scene switching point detectors 105-1 to 105-$n$ are supplied to the control unit 101. The information concerning the scene switching points in each of the systems is time-of-day information associated with a time code added to the video signal and recorded. For example, among a series of time codes added to the video signal and recorded, a time code at a detected scene switching point is set as information concerning the scene switching point. A configuration example of the scene switching point detector is explained later.

The optical disk drive 106 applies recording and reproduction to the DVD 17 as a recording medium. The optical disk drive 106 records, during recording, the video and audio recording data, which is generated by the recording and reproduction processing unit 104, in the DVD 107. The optical disk drive 106 records the information concerning the scene switching points in the plural systems, which is obtained by the scene switching point detectors 105-1 to 105-$n$ of the scene-switching-point detecting unit 105, in the DVD 107. In this case, the video and audio recording data and the information concerning the scene switching points are recorded as separate files but are recorded in association with each other.

The optical disk drive 106 reproduces, during reproduction, the video and audio data from the DVD 107 and supplies the video and audio data to the recording and reproduction processing unit 104. When the optical disk drive 106 reproduces the video and audio data from the DVD 107, the optical disk drive 106 reproduces the information concerning the scene switching points in the plural systems recorded in association with the video and audio data and supplies the information concerning the scene switching points to the control unit 101.

The event generator 108 selects a predetermined point as an event on the basis of the information concerning the scene switching points in the plural systems reproduced by the optical disk drive 106. For example, the event generator 108 sets each of scene switching points obtained from the information concerning the scene switching points in the plural systems as an event candidate point, detects a score on the basis of the information concerning the scene switching points in the plural systems at each of event candidate points, and selects a predetermined point as an event on the basis of the score of each of the event candidate points. A configuration example of the event generator 108 is explained later.

Operations of the recording and reproducing apparatus 100 shown in FIG. 1 are explained below.

First, operations during recording are explained. A video signal and an audio signal inputted to the input terminals 103V and 103A are supplied to the recording and reproduction processing unit 104. The recording and reproduction processing unit 104 applies recording processing such as compression encoding corresponding to a recording format to the video signal and the audio signal inputted to the input terminals 103V and 103A to generate video and audio data as recording data. The video and audio data is supplied to the optical disk drive 106 and recorded in the DVD 107.

The video signal and the audio signal inputted to the input terminals 103V and 103A are supplied to the scene-switching-point detecting unit 105. The scene switching point detectors 105-1 to 105-$n$ of the scene-switching-point detecting unit 105 process any one or both of the video signal and the audio signal to detect scene switching points. Information concerning scene switching points in plural systems obtained by the scene switching point detectors 105-1 to 105-$n$ is supplied to the optical disk drive 106 via the control unit 101 and recorded in the DVD 107 in association with the video and audio data.

Operations during reproduction are explained below. The optical disk drive 106 reproduces the video and audio data from the DVD 107. The video and audio data as reproduction data is supplied to the recording and reproduction processing unit 104. The recording and reproduction processing unit 104 applies decoding processing or the like to the video and audio data to generate a video signal and an audio signal.

The video signal and the audio signal generated by the recording and reproduction processing unit 104 in this way are outputted to the output terminals 109V and 109A. Therefore, the video signal and the audio signal are supplied to a monitor 110 connected to the output terminals 109V and 109A. A reproduced image is displayed on the monitor 110 and reproduced sound is outputted from the monitor 110.

The optical disk drive 106 reproduces, from the DVD 107, the information concerning the scene switching points in the plural systems recorded in association with the video and audio data. The information concerning the scene switching points in the plural systems is supplied to the event generator 108 via the control unit 101. The event generator 108 selects a predetermined point as an event on the basis of the information concerning the scene switching points in the plural systems. The event generated by the event generator 108 is supplied to the control unit 101.

The control unit 101 uses the event, which is generated by the event generator 108, as, for example, control information for a reproduction skip position. When a user performs skip operation for a reproduction position using the user operation unit 102 in order to check contents or search for an editing point, the control unit 101 sequentially skips a reproduction position to points of the event generated by the event generator 108.

Figure 2:
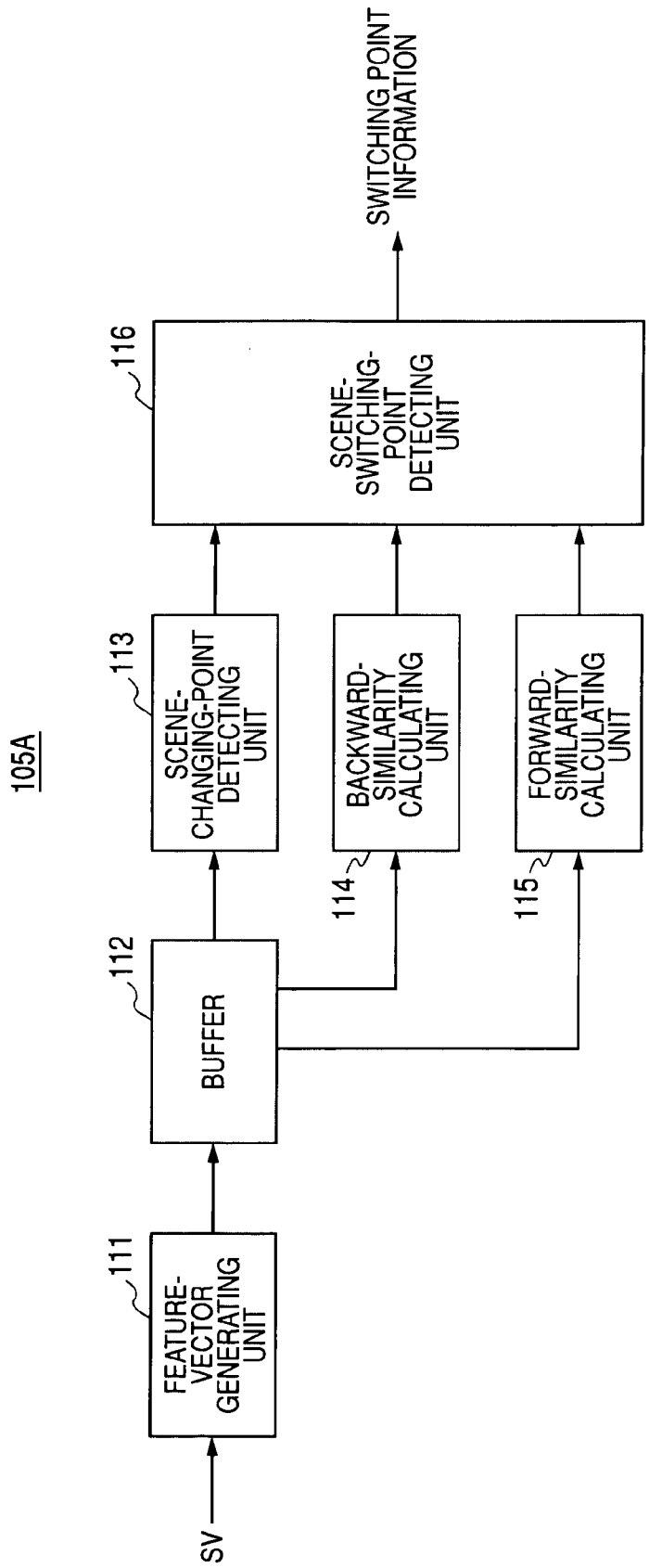
FIG. 2 is a block diagram of a configuration example of a scene switching point detector.

A configuration example of a predetermined scene switching point detector 105A included in the scene-switching-point detecting unit 105 is explained. FIG. 2 is a diagram of the configuration example of the scene switching point detector 105A. The scene switching point detector 105A includes a feature-vector generating unit 111, a buffer 112, a scene-change-point detecting unit 113, a backward-similarity calculating unit 114, a forward-similarity calculating unit 115, and a scene-switching-point detecting unit 116.

The feature-vector generating unit 111 configures a feature-information generating unit. The feature-vector generating unit 111 sets a frame at every fixed time (e.g., every 0.5 second) of a video signal SV as a target frame and generates a feature vector indicating a feature of each of target frames. The feature-vector generating unit 111 divides an image of the target frame into plural blocks, processes a pixel signal for each of the blocks to calculate a vector element, and generates a feature vector formed by each of vector elements.

Figure 3:
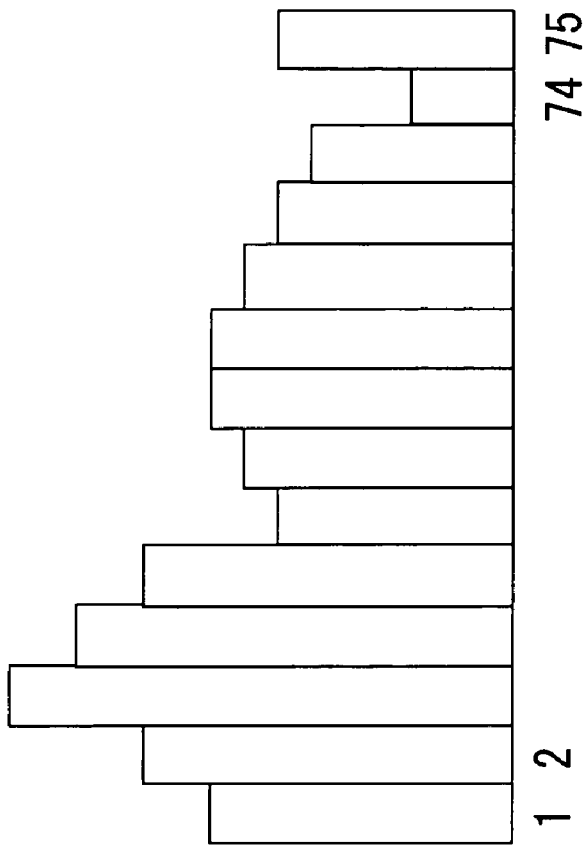
FIGS. 3A and 3B are diagrams for explaining generation of feature vectors indicating a feature of an image of each of target frames.

For example, as shown in FIG. 3A, an image of a frame is divided into five blocks in each of the vertical and horizontal directions, twenty-five blocks in total. In each of the blocks, pixel signals of luminance (Y), red color difference (Cr), and blue color difference (Cb) are processed and vector elements related to the luminance (Y), the red color difference (Cr), and the blue color difference (Cb) are calculated. When there are n pixel signals x1 to xn in the block, as processing for the pixel signals, processing for calculating an average indicated by Formula (1), processing for calculating a standard deviation indicated by Formula (2), processing indicated by Formula (3), or the like is performed. An x bar in Formulas (2) and (3) indicates an average of x1 to xn.

$$\text{Vector element} = (x_1 + x_2 + \ldots + x_n)/n \quad (1)$$

$$\text{Vector element} = \sqrt[2]{\frac{\sum (xi - \overline{x})^2}{n}} \quad (2)$$

$$\text{Vector element} = \sqrt[3]{\frac{\sum |xi - \overline{x}|^3}{n}} \quad (3)$$

In each of the blocks, the vector elements related to the luminance (Y), the red color difference (Cr), and the blue color difference (Cb) are calculated. Therefore, when the image of the frame is divided into twenty-five blocks as explained above, as shown in FIG. 3B, seventy-five (25×3) vector elements are obtained. The feature-vector generating unit 111 outputs feature vectors including the seventy-five vector elements.

The buffer 112 temporarily stores the feature vectors of each of the target frames generated by the feature-vector generating unit 111 in order to use the feature vectors in processing for detecting scene switching points.

The scene-change-point detecting unit 113 sets each of the target frames as a scene change point detection frame in order and detects a scene change point, i.e., the target frame forming the scene change point. The scene-change-point detecting unit 113 compares a feature vector of the scene change point detection frame stored in the buffer 112 and a feature vector of a target frame temporally located before or after the scene change point detection frame and detects whether the scene change point detection frame is the target frame forming the scene change point.

In this case, when an inter-vector distance between the feature vector of the scene change point detection frame and the feature vector of the target frame temporally located before or after the scene change point detection frame, i.e., a sum of difference absolute values between vector elements corresponding to each other is larger than a threshold set in advance, the scene change point detection frame is detected as a scene change point.

The backward-similarity calculating unit 114 sets each of the target frames as a similarity detection frame in order and calculates backward similarity. The backward-similarity calculating unit 114 calculates backward similarity on the basis of the feature vector of the similarity calculation frame generated by the feature-vector generating unit 111 and feature vectors of a predetermined number (m pieces) of the target frames temporally located before the similarity calculation frame. In this case, the backward-similarity calculating unit 114 calculates similarities between the similarity calculation frame and the predetermined number of the target frames temporally located before the similarity calculation frame and calculates a sum of the similarities to calculate backward similarity.

The forward-similarity calculating unit 115 sets each of the target frames as a similarity calculation frame in order and calculates forward similarity. The forward-similarity calculating unit 115 calculates forward similarity on the basis of the feature vector of the similarity calculation frame generated by the feature-value generating unit 111 and feature vectors of a predetermined number (m pieces) of the target frames temporally located after the similarity calculation frame. In this case, the forward-similarity calculating unit 115 calculates similarities between the similarity calculation frame and the predetermined number of the target frames temporally located after the similarity calculation frame and calculates a sum of the similarities to calculate forward similarity.

Figures 4, 5:
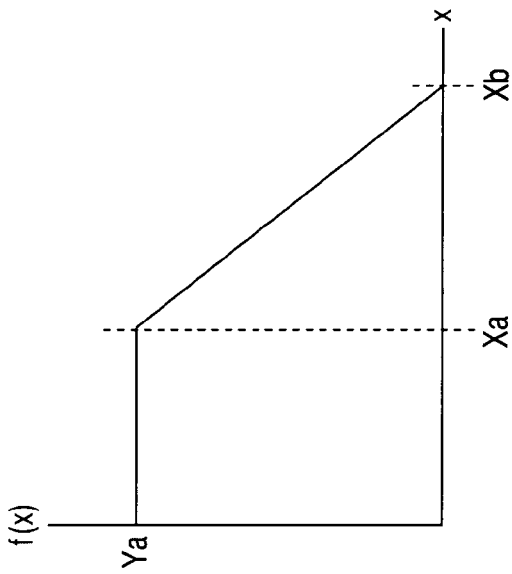
FIG. 4 is a diagram for explaining an example of calculation of backward similarity and forward similarity.
FIG. 5 is a diagram of an example of a conversion function for converting inter-feature vector distance dsit(Xi, Xj) into similarity Sim(Xi, Xj)

An example of calculation of backward similarity and forward similarity is explained with reference to FIG. 4. In the explanation below, a similarity calculation frame is an ith target frame.

When it is assumed that a feature vector of each of the target frames includes n vector elements, a feature vector Xi of the ith target frame is represented as indicated by Formula (4). A feature vector of a jth target frame located before or after the ith target vector is represented as indicated by Formula (5). In Formula (4), xi1 to xin are n vector elements forming the feature vector Xi. In Formula (5), xj1 to xjn are n vector elements forming the feature vector Xj.

$$X_i = \begin{bmatrix} x_{i1} \\ x_{i2} \\ \vdots \\ x_{in} \end{bmatrix} \quad (4)$$

$$X_j = \begin{bmatrix} x_{j1} \\ x_{j2} \\ \vdots \\ x_{jn} \end{bmatrix} \quad (5)$$

A distance between the feature vector Xi and the feature vector Xj, i.e., an inter-feature vector distance dsit(Xi, Xj) is calculated by Formula (6). The inter-feature vector distance dsit(Xi, Xj) is converted into similarity Sim(Xi, Xj) by using a conversion function of Formula (7). FIG. 5 is a diagram of an example of a conversion function. In the case of the conversion function shown in FIG. 5, similarity Sim(Xi, Xj) takes a fixed value Ya when the inter-feature vector distance dist(Xi, Xj) is within xa. However, when the inter-feature vector distance dsit(Xi, Xj) exceeds xa, as the value increases, the similarity Sim(Xi, Xj) falls from the fixed value Ya. When the inter-feature vector distance dsit(Xi, Xj) exceeds xb, the similarity Sim(Xi, Xj) falls to 0.

$$dsit(X_i, X_j) = \sum_{k=1}^{m} |x_{ik} - x_{jk}| \qquad (6)$$

$$Sim(X_i, X_j) = f(dsit(X_i, X_j)) \qquad (7)$$

As indicated by Formula (8), backward similarity Bwdsim (i) of the ith target frame is calculated as a sum of similarities Sim(Xi, Xi−m) to Sim(Xi, Xi−1) between the ith target frame and i−mth to i−1th target frames. Similarly, as indicated by Formula (9), forward similarity Fwdsim(i) of the ith target frame is calculated as a sum of similarities Sim(Xi, Xi+1) to Sim(Xi, Xi+m) between the ith target frame and i+1th to i+mth target frames.

$$Bwdsim(i) = \sum_{j=i-m}^{i-1} Sim(X_i, X_j) \qquad (8)$$

$$Fwdsim(i) = \sum_{j=i+1}^{i+m} Sim(X_i, X_j) \qquad (9)$$

The scene-switching-point detecting unit 116 detects, on the basis of the backward similarity of each of the target frames calculated by the backward-similarity calculating unit 114 and the forward similarity of each of the target frames calculated by the forward-similarity calculating unit 115, a scene switching point, i.e., the detection frame forming the scene switching point. The scene-switching-point detecting unit 116 detects, for example, the target frame, the backward similarity of which suddenly falls and the forward similarity of which suddenly rises, as the target frame forming the scene switching point.

In this case, the scene-switching-point detecting unit 116 can detect, by selecting larger one of a value obtained by subtracting the backward similarity Bwdsim(i) of the ith target frame from backward similarity Bwdsim(i−1) of the i-ith target frame (Bwdsim(i−1)−Bwdsim(i)) and 0 (Max(Bwdsim(i−1)−Bwdsim(i), 0)), whether the backward similarity Bwdsim(i) of the ith target frame suddenly falls. When the backward similarity Bwdsim(i) of the ith target frame suddenly falls, Max(Bwdsim(i−1)−Bwdsim(i), 0) takes a large value.

The scene-switching-point detecting unit 116 can detect, by selecting larger one of a value obtained by subtracting forward similarity Fwdsim(i−1) of the i−1th target frame from the forward similarity Fwdsim(i) of the ith target frame (Fwdsim(i)−Fwdsim(i−1)) and 0 (Max(Fwdsim(i)−Fwdsim(i−1), 0)), whether the forward similarity Fwdsim(i) of the ith target frame suddenly rises. When the forward similarity Fwdsim(i) of the ith target frame suddenly rises, Max(Fwdsim(i)−Fwdsim(i−1), 0) takes a large value.

Figure 6:
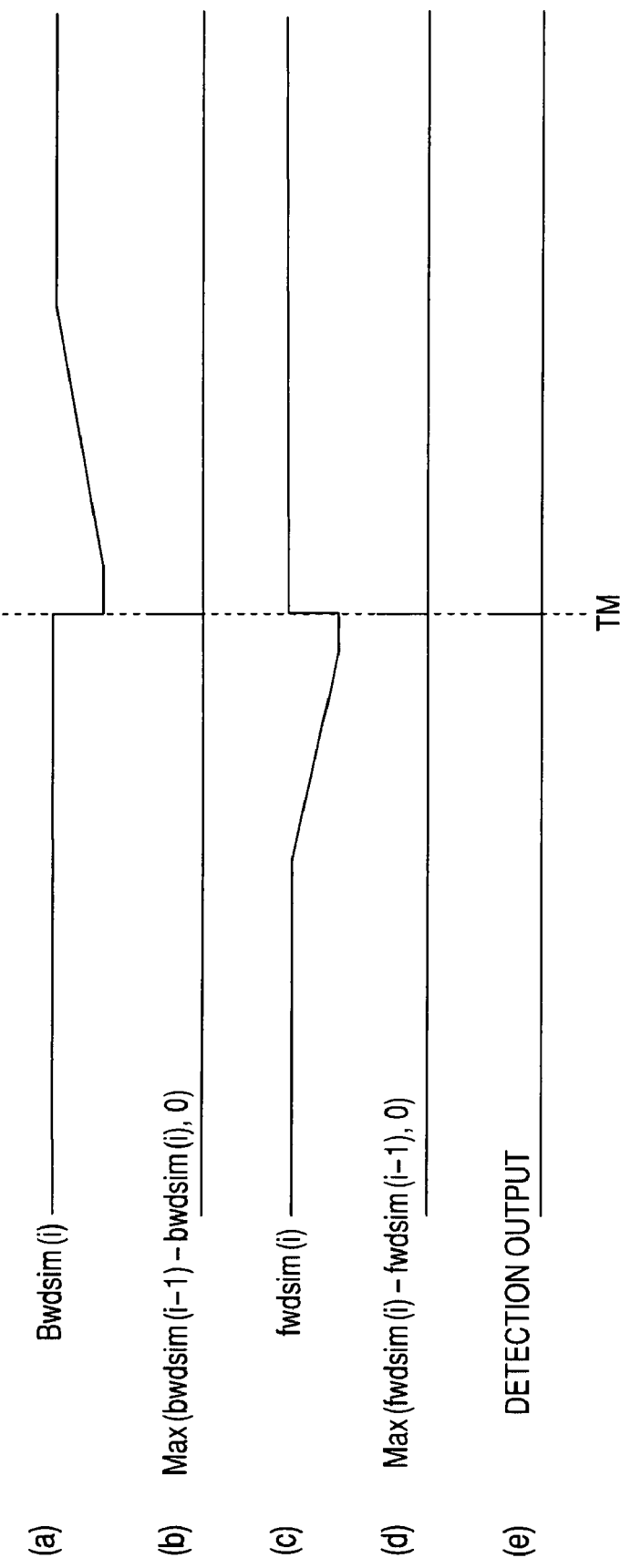
FIG. 6 is a diagram for explaining processing for detecting a scene switching point based on backward similarity Bwdsim(i) and forward similarity Fwdsim(i)

It is assumed that the backward similarity Bwdsim(i) changes as shown in (a) of FIG. 6 and the forward similarity Fwdsim(i) changes as shown in (c) of FIG. 6. In this case, Max(Bwdsim(i−1)−Bwdsim(i), 0) changes as shown in (b) of FIG. 6 and Max(Fwdsim(i)−Fwdsim(i−1), 0) changes as shown in (d) of FIG. 6. Therefore, in this case, the scene-switching-point detecting unit 116 sets a point at TM, where both Max(Bwdsim(i−1)−Bwdsim(i), 0) and Max(Fwdsim(i)−Fwdsim(i−1), 0) take large values, as a scene switching point according to the backward similarity Bwdsim(i) and the forward similarity Fwdsim(i).

When the scene switching point (the target frame forming the scene switching point) according to the backward similarity Bwdsim(i) and the forward similarity Fwdsim(i) detected as explained above coincides with a scene change point (the target frame forming the scene change point) detected by the scene-change-point detecting unit 113, the scene-switching-point detecting unit 116 sets the latter target frame as the scene switching point, i.e., the target frame forming the scene switching point.

The scene-switching-point detecting unit 116 outputs, as information concerning the scene switching point, time-of-day information of the target frame forming the scene switching point detected as explained above (time-of-day information associated with a time code added to a video signal and recorded).

Operations of the scene switching point detector 105A shown in FIG. 2 are explained below with reference to FIG. 7.

Figure 7:
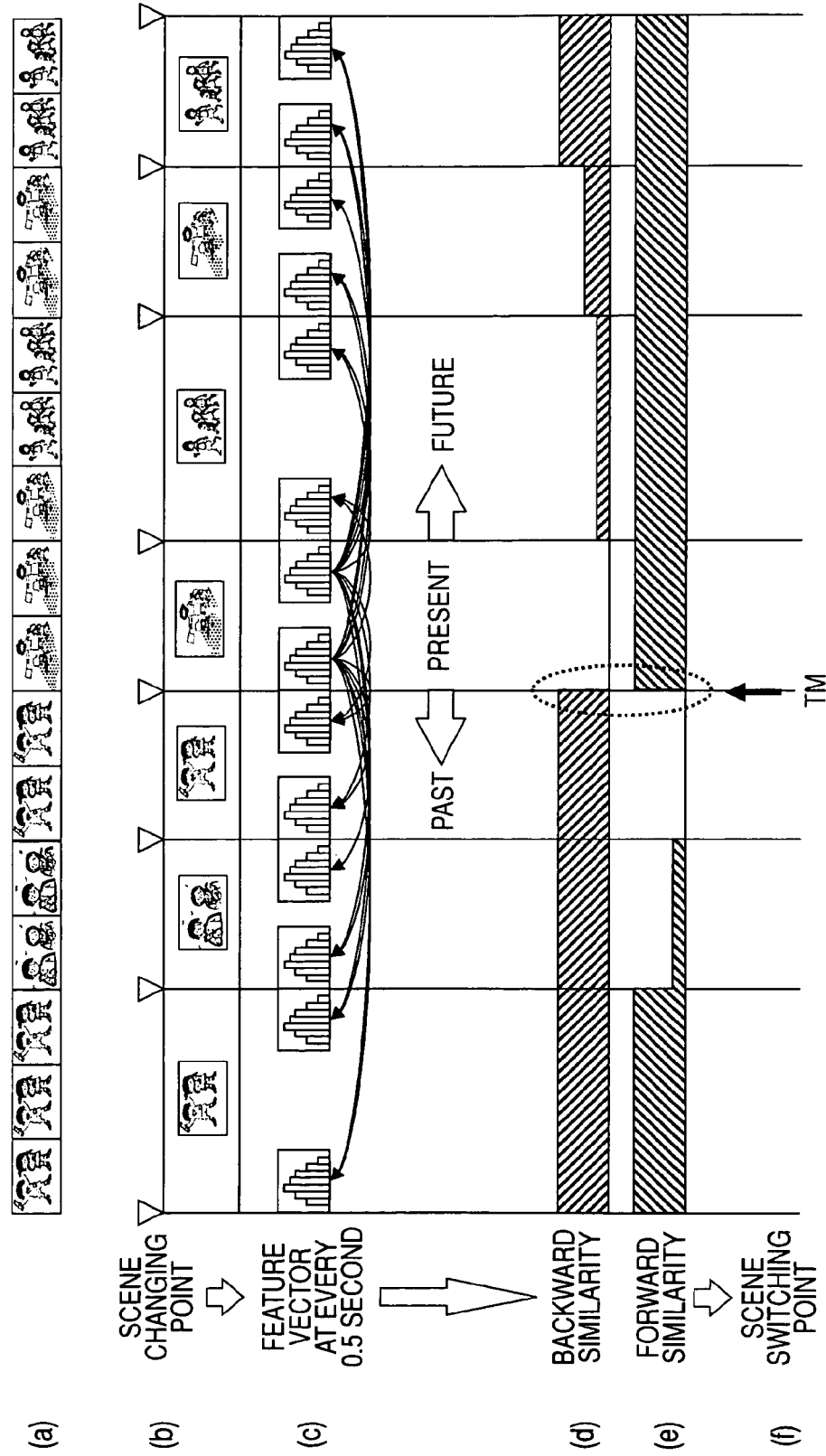
FIG. 7 is a diagram for explaining operations of the scene switching point detector.

A video signal SV (see (a) of FIG. 7), in which a scene switching point should be detected, is supplied to the feature-vector generating unit 111. The feature-vector generating unit 111 sets frames at every fixed time (e.g., every 0.5 second) of the video signal SV as target frames and generates a feature vector indicating a feature of an image of each of the target frames (see (c) of FIG. 7). The feature vector of each of the target frames generated by the feature-vector generating unit 111 is temporarily stored in the buffer 112 in order to be used in processing for detecting scene switching points.

The scene-change-point detecting unit 113 sets each of the target frames as a scene change point detection frame in order and detects a scene change point, i.e., the target frame forming the scene change point (see (b) of FIG. 7). In this case, the scene-change-point detecting unit 113 compares a feature vector of the scene change point detection frame stored in the buffer 112 and a feature vector of the target frame temporally located before or after the scene change point detection frame and detects whether the scene change point detection frame is the target frame forming the scene change point. A detection output of the scene-change-point detecting unit 113 is supplied to the scene-switching-point detecting unit 116.

The backward-similarity calculating unit 114 sets each of the target frames as a similarity calculation frame in order and calculates backward similarity (see (d) of FIG. 7). In this case, the backward-similarity calculating unit 114 calculates backward similarity on the basis of a feature vector of the similarity calculation frame and feature vectors of m pieces of the target frames temporally located before the similarity calculation frame. A calculation result of the backward-similarity calculating unit 114 is supplied to the scene-switching-point detecting unit 116.

The forward-similarity calculating unit 115 sets each of the target frames as a similarity calculation frame in order and calculates forward similarity (see (e) of FIG. 7). In this case, the forward-similarity calculating unit 115 calculates forward similarity on the basis of a feature vector of the similarity calculation frame and feature vectors of m pieces of the target frames temporally located after the similarity calculation frames. A calculation result of the forward-similarity calculating unit 115 is supplied to the scene-switching-point detecting unit 116.

The scene-switching-point detecting unit 116 detects, on the basis of the backward similarity of each of the target frames calculated by the backward-similarity calculating unit 114 and the forward similarity of each of the target frames calculated by the forward-similarity calculating unit 115, a scene switching point, i.e., the target frame forming the scene switching point. For example, the scene-switching-point detecting unit 116 detects the target frame, the backward similarity of which suddenly falls and the forward similarity of which suddenly rises, as the target frame forming the scene switching point.

When the scene switching point (the target frame forming the scene switching point) according to the backward similarity and the forward similarity detected as explained above coincides with the scene change point (the target frame forming the scene change point) detected by the scene-change-point detecting unit 113, the scene-change-point detecting unit 116 sets the latter target frame as a scene switching point TM (see (f) of FIG. 7).

The scene-switching-point detecting unit 116 outputs, as information concerning the scene switching point, time-of-day information (time-of-day information associated with a time code added to a video signal and recorded) indicating the scene switching point (a frame forming the scene switching point).

The scene switching point detector 105A shown in FIG. 2 can be realized by software as well other than hardware. When the scene switching point detector 105A is realized by software, a processing program causes a computer to function in the same manner as the units of the scene switching point detector 105A shown in FIG. 2.

The scene switching point detector 105A shown in FIG. 2 generates a feature vector as feature information of an image of each of the target frames and uses the feature vector. However, as the feature information, a histogram of luminance or color difference generated by processing a pixel signal of the image of the target frame may be used. In this case, similarity between the similarity calculation frame and the target frame located before or after the similarity calculation frame can be obtained as an intersection of histograms.

Figure 8:
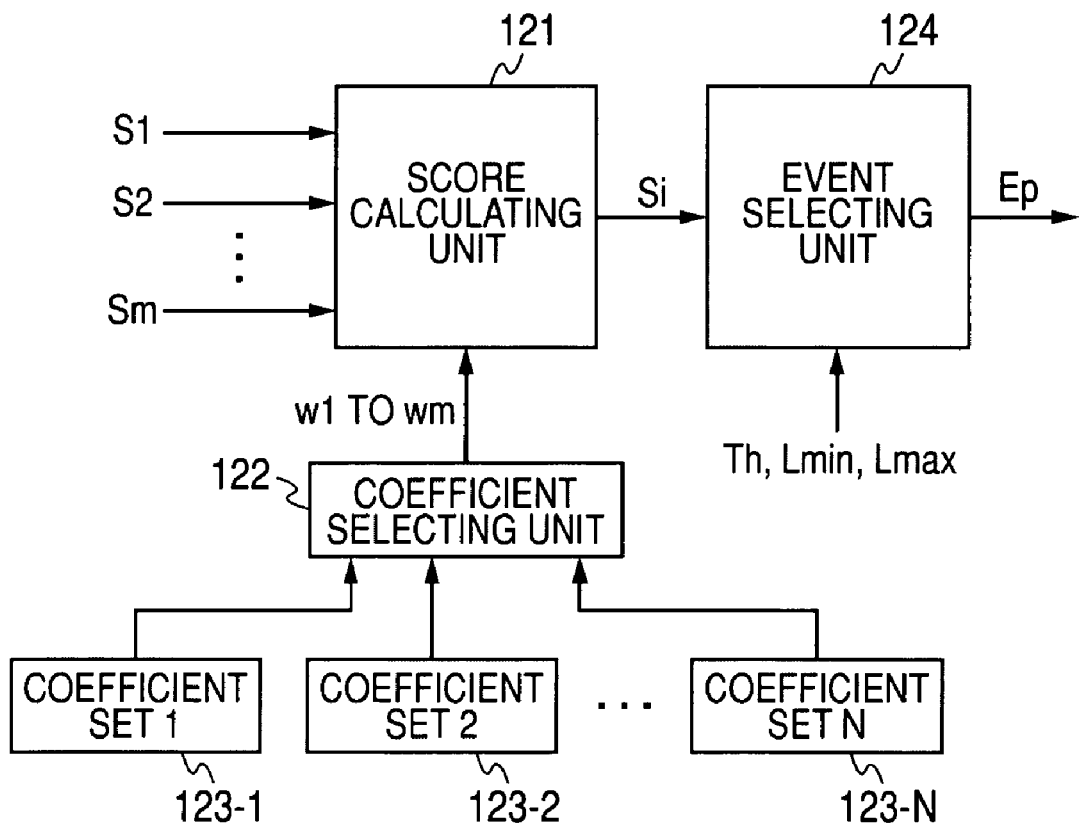
FIG. 8 is a block diagram of a configuration example of an event generator.

A configuration example of the event generator 108 is explained below. FIG. 8 is a diagram of the configuration example of the event generator 108. The event generator 108 includes a score calculating unit 121, a coefficient selecting unit 122, coefficient sets (combinations of weighing coefficients) 123-1 to 123-N, and an event selecting unit 124.

Information S1 to information Sm concerning scene switching points in plural systems, in this example, m systems, are supplied to the score calculating unit 121 from the control unit 101. The score calculating unit 121 sets each of the scene switching points as an event candidate and calculates a score of each of event candidate points on the basis of the information S1 to Sm concerning the scene switching points in the m systems. It is anticipated that there are overlapping points in the scene switching points indicated by the information concerning the scene switching points. Therefore, a final number of the scene switching points based on the information S1 to Sm concerning the scene switching points in the m systems is equal to or smaller than a total of the numbers of the scene switching points indicated by the information concerning each of the scene switching points.

The score calculating unit 121 calculates the score of each of the event candidate points basically by adding up first values obtained in the event candidate points from the information S1 to Sm concerning the scene switching points in the m systems. In this embodiment, as explained above, the information concerning the scene switching points is time-of-day information (time-of-day information associated with a time code added to a video signal and recorded) indicating the scene switching points. First values obtained from information concerning scene switching points in a certain system at a predetermined event candidate point are set to 1 when the predetermined event candidate point is a scene switching point indicated by the information concerning the scene switching points in the certain system. Otherwise, the first values are set to 0.

The coefficient selecting unit 122 selects weighting coefficients w1 to wm corresponding to the information S1 to Sm of the scene switching points in the m systems from N coefficient sets 123-1 to 123-N and outputs the weighting coefficients w1 to wm to the score calculating unit 121. The selection of the coefficient sets in the coefficient selecting unit 122 is controlled by the control unit 101 on the basis of the operation of the user operation unit 102 by the user. The coefficient selecting unit 122 and the coefficient sets 123-1 to 123-N configure a weighting-coefficient generating unit.

To calculate a score of each of event candidate points, the score calculating unit 121 does not directly add up the first values obtained at each of the event candidate points from the information S1 to Sm concerning the scene switching points in the m systems. Instead, the score calculating unit 121 multiplies the first values obtained in each of the event candidate points from the information S1 to Sm concerning the scene switching points in the m systems with the weighting coefficients w1 to wm from the coefficient selecting unit 122 to calculate second values and adds up the second values to calculate a score.

A score Si of an ith event candidate point is calculated by Formula (10) when first values obtained from the information S1 to Sm concerning the scene switching points in the m systems at this candidate point are Si1 to Sim.

$$S_i = \sum_{j=1}^{m} S_{ij} \cdot w_j \tag{10}$$

As explained above, the score calculating unit 121 multiplies the first values obtained from the information S1 to Sm concerning the scene switching points in the m systems with the weighting coefficients w1 to wm to calculate second values and adds up the second values to calculate a score. With this configuration, for example, if weight for information concerning scene switching points in a desired system is set high, it is possible to increase the influence of the information concerning the scene switching points.

As explained above, the weighting coefficients w1 to wm corresponding to the information S1 to Sm concerning the scene switching points in the m systems are selected from the N coefficient sets 123-1 to 123-N. With this configuration, it is possible to change weight for the information concerning the scene switching points in each of the systems and change the influence of the weight. Further, it is possible to vary an event candidate point to be selected as an event.

In the above explanation, the information concerning the scene switching points in the m systems inputted to the score calculating unit 121 is the information concerning time of day (a time code) indicating a scene switching point (a frame forming the scene switching point). However, the information concerning the scene switching points in the m system inputted to the score calculating unit 121 may be a value (a kind of score) indicating likelihood of a scene switching point at each time of day (time code) at every fixed time. In this case, first values obtained from the information concerning the scene switching points in a certain system and used for calculating a score of a predetermined event candidate point in the score calculating unit 121 are set to a value indicating likelihood of a scene switching point in the certain system at the predetermined event candidate point.

Figure 9:
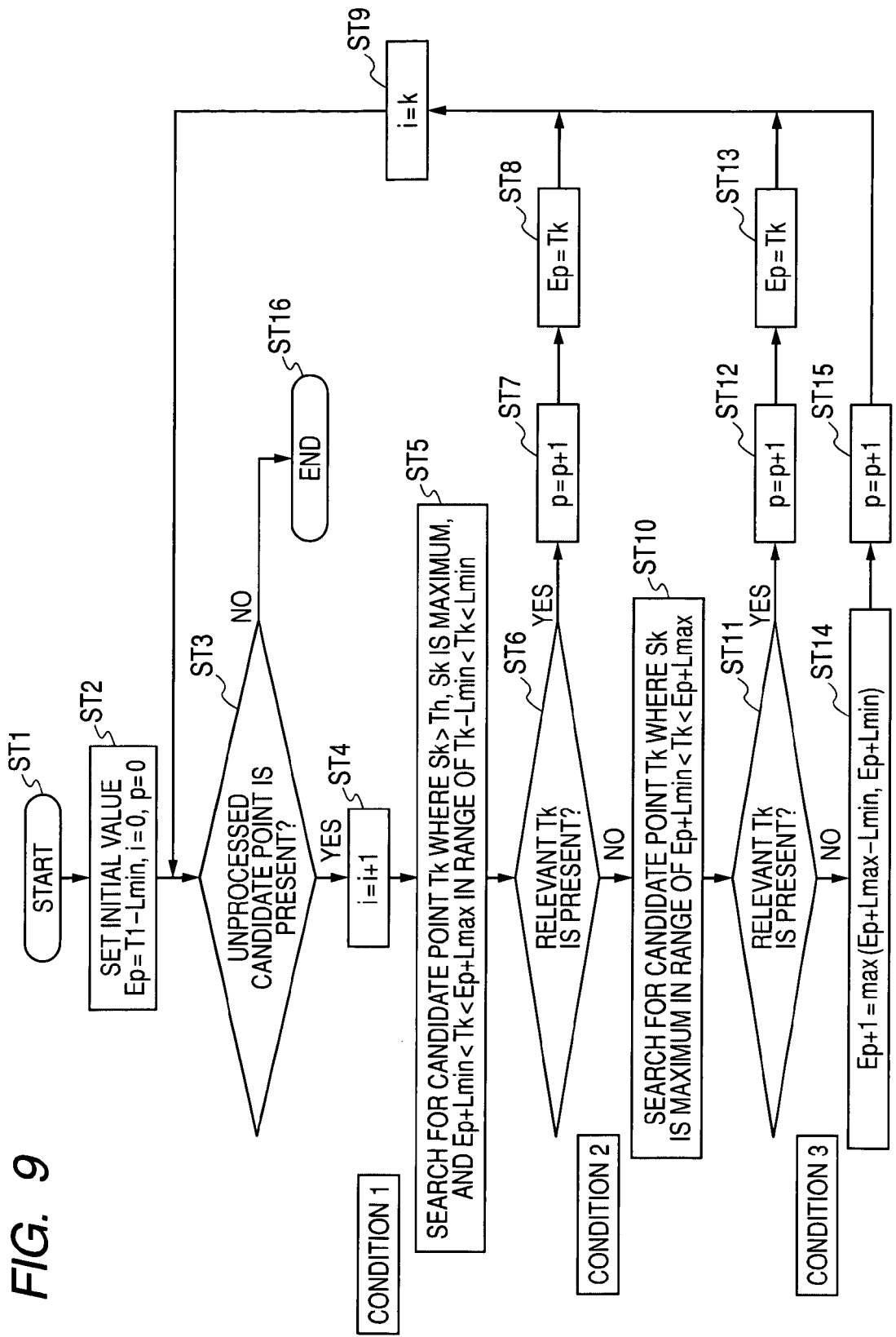
FIG. 9 is a flowchart for explaining event generation processing based on each of event candidate points in an event selecting unit.

The score Si of each of the event candidate points calculated by the score calculating unit 121 is supplied to the event selecting unit 124. The event selecting unit 124 generates a predetermined point as an event on the basis of the score Si of each of the event candidate points. The event selecting unit 124 generates an event according to a flowchart of FIG. 9.

First, in step ST1, the event selecting unit 124 starts processing for event selection and, then, shifts to processing in step ST2. In step ST2, the event selecting unit 124 performs initial value setting. The event selecting unit 124 sets a dummy event Ep to T1−Lmin, sets "i" to 1, and sets "p" to 0. Ep indicates a pth event, T1 indicates time of day (a time code) of a first event candidate point, Lmin indicates a shortest event interval, and "i" indicates a number of the event candidate point.

Subsequently, in step ST3, the event selecting unit 124 determines whether an unprocessed event candidate point is present. When an unprocessed event candidate point is present, in step ST4, the event selecting unit 124 increments "i" and, then, shifts to processing in step ST5.

In step ST5, the event selecting unit 124 searches for, in a range of Tk−Lmin<Tk<Tk+Lmin, event candidate points Tk where Sk>Th and Sk is the maximum and Ep+Lmin<Tk<Ep+Lmax (event candidate points matching a condition 1), in order from the ith event candidate, point. Tk indicates a kth event candidate point, Lmax indicates a longest event interval, Sk indicates a score of the kth event candidate point Tk, and Th indicates a threshold. The threshold Th is a minimum score for selection as an event.

In step ST6, the event selecting unit 124 determines whether an event candidate point matching the condition 1 is present. When the event candidate point Tk matching the condition 1 is present, in step ST7, the event selecting unit 124 increments "p" and, then, in step ST8, sets the event candidate point Tk matching the condition 1 as the pth event Ep. After the processing in step ST8, in step ST9, the event selecting unit 124 sets "i" to k, returns to the processing in step ST3, and shifts to the processing for an unprocessed event candidate point.

When no event candidate point Tk matching the condition 1 is present in step ST6, in step ST10, the event selecting unit 124 searches for, in a range of Ep+Lmin<Tk<Ep+Lmax, the event candidate points Tk where the score Sk is the maximum (event candidate points matching a condition 2) in order from the ith event candidate point.

In step ST11, the event selecting unit 124 determines whether an event candidate point matching the condition 2 is present. When the event candidate point Tk matching the condition 2 is present, in step ST13, the event selecting unit 124 increments "p" and, then, in step ST13, sets the event candidate point Tk matching the condition 2 as the pth event Ep. After the processing in step ST13, in step ST9, the event selecting unit 124 sets "i" to k, returns to the processing in step ST3, and shifts to the processing for an unprocessed event candidate point.

When no event candidate point Tk matching the condition 2 is present, in step ST11, the event selecting unit 124 shifts to processing in step ST14. In step ST14, the event selecting unit 124 sets a predetermined point in a range of Ep+Lmin to Ep+Lmax, for example, a temporally later point of Ep+Lmax-Lmin and Ep+Lmin, as a p+1th event Ep+1 (an event according to a condition 3). After the processing in step ST14, in step ST15, the event selecting unit 124 increments "p". In step ST9, the event selecting unit 124 sets "i" to k, returns to the processing in step ST3, and shifts to the processing for an unprocessed event candidate point.

When no unprocessed candidate point is present in step ST3, the event selecting unit 124 immediately proceeds to step ST16 and finishes the processing for selecting an event.

Figure 10:
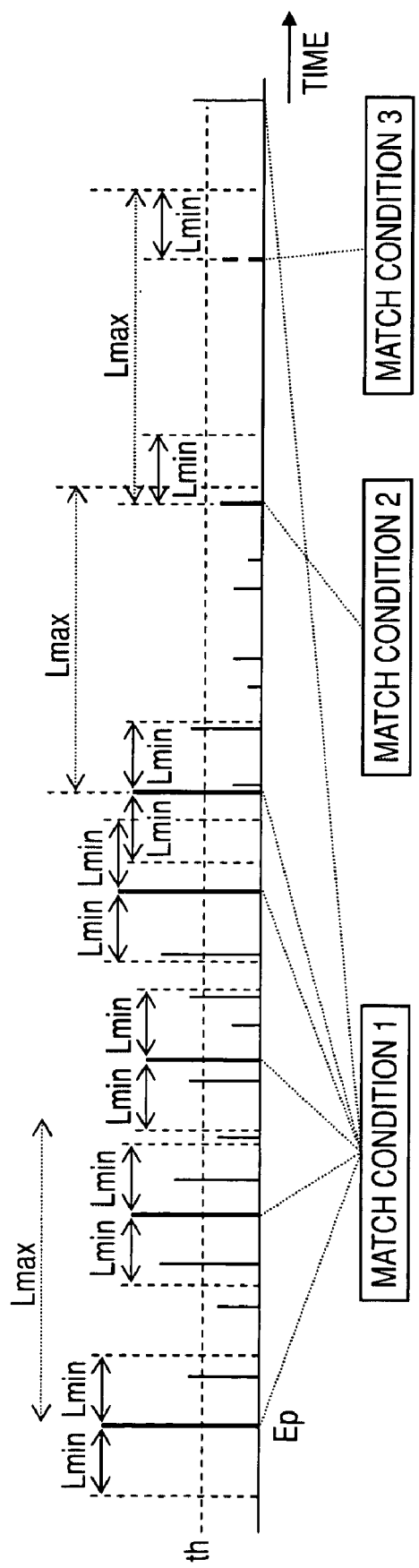
FIG. 10 is a diagram of an example of event candidate points and events to be selected or generated.

FIG. 10 is a diagram of an example of event candidate points. Positions of the event candidate points are indicated by bar positions and scores of the event candidate points are indicated by the lengths of bars. When the event candidate points are present as in this example, events matching the condition 1, an event matching the condition 2, and an event according to the condition 3 are generated as shown in the figure. In this case, the events matching the condition 1 and the condition 2 are selected from the event candidate points. However, the event according to the condition 3 is a point not present in the event candidate points. In FIG. 10, the event according to the condition 3 is indicated by a bar of a broken line. The bar of the broken line does not represent an event candidate point. There is no meaning in the length of the bar.

A threshold Th, a shortest event interval Lmin, a longest event interval Lmax used in the event selection processing by the event selecting unit 124 are given from the control unit 101 (see FIG. 1). The user can operate the user operation unit 102 to change values of the threshold Th, the shortest event interval Lmin, and the longest event interval Lmax.

The event selecting unit 124 selects the event candidate point Tk, the score Sk of which is equal to or larger than the threshold Th, as an event and selects a more appropriate event candidate point among the event candidate points as an event. Since a value of the threshold Th can be changed according to the operation by the user, it is possible to change the threshold Th and adjust the number of event candidate points that can be selected as events.

The event selecting unit 124 selects, as an event, the event candidate point Tk that satisfies a condition that the score Sk is equal to or larger than the threshold Th and no other event candidate point having a score larger than the score Sk of the event candidate point Tk is present in a range of the shortest event interval Lmin before and after the event candidate point Tk. Therefore, it is possible to prevent plural events from being generated in the shortest event interval Lmin. Since a value of the shortest event interval Lmin can be changed according to the operation by the user, it is possible to arbitrarily adjust a shortest interval of an event to be selected.

When no event candidate point Tk that satisfies a condition that the score Sk is equal to or higher than the threshold Th and no other event candidate point having a score larger than the score Sk of the event candidate point Tk is present in a range of the shortest event interval Lmin before and after the event candidate point Tk is present in a fixed range after the shortest event interval Lmin and before the longest event interval Lmax from another event candidate point selected as an event, the event selecting unit 124 selects an event candidate having a largest score among event candidate points in the fixed range as an event. Therefore, it is possible to prevent an interval of an event to be selected from becoming longer than the longest event interval Lmax. Since a value of the longest event interval Lmax can be changed according to operation by the user, it is possible to arbitrarily adjust a longest interval of an event to be selected.

When no event candidate point is present in a fixed range after the shortest event interval Lmin and before the longest event interval Lmax from another event candidate point selected as an event, the event selecting unit 124 selects a predetermined point in this fixed range and an event. Therefore, it is possible to prevent an interval of an event to be selected from becoming longer than the longest event interval Lmax.

The event generator 108 shown in FIG. 8 can be realized by software as well other than hardware. When the event generator 108 is realized by software, a processing program causes a computer to function in the same manner as the units of the event generator 108 shown in FIG. 8.

As explained above, in the recording and reproducing apparatus 100 shown in FIG. 1, the scene switching point detector 105A included in the scene-switching-point detecting unit 105 (see FIG. 2) sets each of the target frames at every fixed time of an input video signal as a similarity calculation frame in order, calculates backward similarity on the basis of the similarity calculation frame and feature information (feature vectors) of m pieces of the target frames located before the similarity calculation frame, and calculates forward similarity on the basis of the similarity calculation frame and feature information (feature vectors) of m pieces of the target frames located after the similarity calculation frame.

The scene switching point detector 105A detects a scene switching point, i.e., the target frame forming the scene switching point on the basis of the backward similarity and the forward similarity of each of the target frames. Since the backward similarity and the forward similarity are used in this way, similar scenes are combined. Therefore, it is possible to detect scene switching points at appropriate intervals.

When the target frame forming the scene switching point detected on the basis of the backward similarity and the forward similarity coincides with the target frame detected by the scene-change-point detecting unit 113, the scene switching point detector 105A sets the latter target frame as the target frame forming the scene switching point. Since information concerning a scene change point (the target frame forming the scene change point) is further used in this way, it is possible to prevent inconvenience that a point (a frame) in one scene is selected as a scene switching point.

In the recording and reproducing apparatus 100 shown in FIG. 1, the event generator 108 sets each of the scene switching points, which are obtained from the information concerning the scene switching points in the m systems, as an event candidate point and selects, on the basis of the score Si of each of the event candidate points calculated on the basis of the information S1 to Sm concerning the scene switching points in the m systems, a predetermined point to be set as an event. Therefore, it is possible to satisfactorily generate an event.

In the embodiment explained above, the present invention is applied to the recording and reproducing apparatus 100 that adopts the DVD 107 as a recording medium. However, it goes without saying that the present invention can also be applied to recording and reproducing apparatuses that handle other recording media such as an HD (Hard Disk) and a semiconductor memory.

The present invention can detect scene switching points at appropriate intervals, can satisfactorily generate an event that can be used as reproduction skip position information or the like from information concerning scene switching points in plural systems, and can be applied to recording and reproducing apparatuses that adopt a DVD, an HD, a semiconductor memory, and the like as recording media.

It should be understood by those skilled in the art that various modifications, combinations, sub-combinations, and alterations may occur depending on design requirements and other factors insofar as they are within the scope of the appended claims or the equivalents thereof.

What we claim is:

1. An event generator comprising:
a score calculating unit that receives input of information concerning scene switching points in plural systems, sets each of the scene switching points as an event candidate point, and calculates a score at each of the event candidate points on the basis of information concerning the scene switching points in the plural systems at each of the event candidate points; and
an event selecting unit that selects a predetermined point as an event on the basis of the score of each of the event candidate points calculated by the score calculating unit,
wherein the event selecting unit selects, as an event, the event candidate point that satisfies a condition that the score is equal to or higher than a threshold,
wherein the event selecting unit selects, as an event, the event candidate point that satisfies a condition that no other event candidate point having a score larger than a score of the event candidate point is present in a range of a shortest event interval before and after the event candidate point, and
wherein the event selecting unit selects, when no event candidate point that satisfies a condition that the score is equal to or higher than the threshold and no other event candidate point having a score larger than the score of the event candidate point is present in a range of the shortest event interval before and after the event candidate point is present in a fixed range after the shortest event interval and before a longest event interval from another event candidate point selected as an event, the event candidate point having a maximum score among the event candidate points in the fixed range as an event.

2. An event generator according to claim 1, further comprising a weighting-coefficient generating unit that generates a weighting coefficient corresponding to the information concerning the scene switching points in the plural systems, wherein
the score calculating unit calculates, for each of event candidate points, second values by multiplying each of the first values obtained from the information concerning the scene switching points in the plural systems with the weighting coefficient generated by the weighting-coefficient generating unit and adds up the second values to calculate a score.

3. An event generator according to claim 1, wherein the event selecting unit selects a predetermined point in the fixed range as an event when no event candidate point is present in the fixed range.

4. An event generator according to claim 3, wherein the event selecting unit selects, when no event candidate point is present in the fixed range, as an event, a temporally later one of a point obtained by adding the shortest event interval to another event candidate point selected as the event and a point obtained by adding the longest event interval to the other event candidate point selected as the event and subtracting the shortest event interval from the other event candidate point.

5. An event generator according to claim 1, wherein
any one of the pieces of information concerning the scene switching points in the plural systems is the information detected by a predetermined scene switching point detector that sets frames at every fixed time of an input video signal as target frames and detects scene switching points, and
the predetermined scene switching point detector includes:
a feature-information generating unit that generates feature information indicating a feature of each of the target frames;
a backward-similarity calculating unit that sets each of the target frames as a similarity calculation frame in order and calculates backward similarity on the basis of the feature information of the similarity calculation frame generated by the feature-information generating unit and the feature information of a predetermined number of the target frames temporally located before the similarity calculation frame;

a forward-similarity calculating unit that sets each of the target frames as a similarity calculation frame in order and calculates forward similarity on the basis of the feature information of the similarity calculation frame generated by the feature-information generating unit and the feature information of a predetermined number of the target frames temporally located after the similarity calculation frame; and a scene switching point detector that detects the target frame forming a scene switching point on the basis of the backward similarity of each of the target frames calculated by the backward-similarity calculating unit and the forward similarity of each of the target frames calculated by the forward-similarity calculating unit.

6. An event generating method comprising the steps of:

receiving input of information concerning scene switching points in plural systems, setting each of the scene switching points as an event candidate point, and calculating a score at each of the event candidate points on the basis of information concerning the scene switching points in the plural systems at each of the event candidate points; and selecting a predetermined point as an event on the basis of the score of each of the event candidate points calculated in the score calculating step, wherein the selecting step:

(i) selects, as an event, the event candidate point that satisfies a condition that the score is equal to or higher than a threshold, (ii) selects, as an event, the event candidate point that satisfies a condition that no other event candidate point having a score larger than a score of the event candidate point is present in a range of a shortest event interval before and after the event candidate point, and (iii) selects, when no event candidate point that satisfies a condition that the score is equal to or higher than the threshold and no other event candidate point having a score larger than the score of the event candidate point is present in a range of the shortest event interval before and after the event candidate point is present in a fixed range after the shortest event interval and before a longest event interval from another event candidate point selected as an event, the event candidate point having a maximum score among the event candidate points in the fixed range as an event.

7. A reproducing apparatus comprising:

a reproducing unit that reproduces, from a recording medium in which a video signal and information concerning scene switching points in plural systems concerning the video signal are recorded in association with each other, the video signal and the information concerning the scene switching points in the plural systems;

an event generator that sets a predetermined point as an event on the basis of the information concerning the scene switching points in the plural systems reproduced by the reproducing unit; and a control unit that controls a reproducing operation for the video signal in the reproducing unit on the basis of the event generated by the event generator, wherein the event generator includes:

a score calculating unit that receives input of the information concerning the scene switching points in the plural systems, sets each of the scene switching points as an event candidate point, and calculates a score at each of the event candidate points on the basis of information concerning the scene switching points in the plural systems at each of the event candidate points; and an event selecting unit that selects a predetermined point as an event on the basis of the score of each of the event candidate points calculated by the score calculating unit, wherein the event selecting unit selects, as an event, the event candidate point that satisfies a condition that the score is equal to or higher than a threshold, wherein the event selecting unit selects, as an event, the event candidate point that satisfies a condition that no other event candidate point having a score larger than a score of the event candidate point is present in a range of a shortest event interval before and after the event candidate point, and wherein the event selecting unit selects, when no event candidate point that satisfies a condition that the score is equal to or higher than the threshold and no other event candidate point having a score larger than the score of the event candidate point is present in a range of the shortest event interval before and after the event candidate point is present in a fixed range after the shortest event interval and before a longest event interval from another event candidate point selected as an event, the event candidate point having a maximum score among the event candidate points in the fixed range as an event.

* * * * *